(12) United States Patent
Gu et al.

(10) Patent No.: US 11,178,728 B1
(45) Date of Patent: Nov. 16, 2021

(54) METHOD AND SYSTEM FOR WIRELESS ROAMING

(71) Applicant: CASSIA NETWORKS INC., San Jose, CA (US)

(72) Inventors: Daguang Gu, Beijing (CN); Haitao Shi, Beijing (CN)

(73) Assignee: CASSIA NETWORKS INC., San Jose, CA (US)

(*) Notice: Subject to any disclaimer, the term of this patent is extended or adjusted under 35 U.S.C. 154(b) by 0 days.

(21) Appl. No.: 16/925,065

(22) Filed: Jul. 9, 2020

(51) Int. Cl.
| | | |
|---|---|---|
| H04W 88/08 | (2009.01) | |
| H04W 48/20 | (2009.01) | |
| H04W 48/16 | (2009.01) | |
| H04B 1/713 | (2011.01) | |
| H04W 36/00 | (2009.01) | |
| H04W 36/30 | (2009.01) | |
| H04W 8/20 | (2009.01) | |

(52) U.S. Cl.
CPC ............ H04W 88/08 (2013.01); H04B 1/713 (2013.01); H04W 8/205 (2013.01); H04W 36/0038 (2013.01); H04W 36/0055 (2013.01); H04W 36/30 (2013.01); H04W 48/16 (2013.01); H04W 48/20 (2013.01)

(58) Field of Classification Search
CPC ..... H04W 88/08; H04W 36/30; H04W 48/20; H04W 36/0038; H04W 48/16; H04W 36/0055; H04W 8/205; H04B 1/713
See application file for complete search history.

(56) References Cited

U.S. PATENT DOCUMENTS

2002/0085719 A1* 7/2002 Crosbie ............. H04W 36/0011 380/248
2019/0306774 A1* 10/2019 Cai ........................ H04W 36/18
2020/0196159 A1* 6/2020 Tellado ................. H04W 36/14

FOREIGN PATENT DOCUMENTS

WO WO-03015315 A1 * 2/2003 ............. H04W 36/03

* cited by examiner

*Primary Examiner* — Brandon J Miller

(57) ABSTRACT

A wireless roaming method and related system are provided. The method is applicable to an access control device and includes: determining a moving direction of a mobile device that is in a first connection connecting with a first access point; establishing, by a second access point and in response to a determination that the moving direction meets a preset condition, a second connection connecting the mobile device with the second access point, and disconnecting, by the first access point, the first connection. The first access point and the second access point are both connected to the access control device, and have a same static address or a same Identity Resolving Key. This method allows the mobile device to securely and seamlessly roam within the coverage areas of different access points.

17 Claims, 10 Drawing Sheets

METHOD AND SYSTEM FOR WIRELESS ROAMING

TECHNICAL FIELD

This application relates generally to wireless connection technologies, and more specifically, to method and system for wireless roaming.

BACKGROUND

Bluetooth is a wireless technology standard that allows wirelessly exchanging data between electronic devices within a short distance. It is mainly applicable for devices in a personal area network (PAN). Bluetooth Low Energy (BLE) protocols are first introduced into the Bluetooth specification at the Bluetooth Core Specification version 4.0 (Bluetooth v. 4.0). With the emergence of various devices that support the BLE protocols, including Bluetooth sensors and Bluetooth tags, applicable scenarios of Bluetooth technology is quickly expanding from devices in the PAN, which are mostly simple personal wearable or peripheral devices, to more sophisticated devices that may be operating in an expanded area. Additionally, some Bluetooth applications, including asset tracking applications and surveillant applications, may involve tens, or even hundreds of, Bluetooth devices. Therefore Bluetooth gateways are needed to coordinate the connections among these Bluetooth devices.

Each individual Bluetooth gateway may have a limited coverage area (e.g., an area within a 50-meter radius), which may be smaller than an area in which a Bluetooth device may be operating, such as a workshop or a supermarket. Therefore, multiple Bluetooth gateways may be needed to manage Bluetooth devices in those areas. In actual Bluetooth applications, a Bluetooth device may move across coverage areas of multiple Bluetooth gateways, thus a Bluetooth roaming method is needed to ensure a continuous and secure Bluetooth connection.

SUMMARY

Various embodiments of the present disclosure may include systems, methods, and non-transitory computer readable media for method and system for wireless roaming.

One aspect of this disclosure is directed to a wireless roaming method, applicable to an access control device. The method may include: determining a moving direction of a mobile device, wherein the mobile device may be in a first connection connecting with a first access point; and, in response to a determination that the moving direction meets a preset condition, establishing a second connection connecting the mobile device with a second access point by the second access point; and disconnecting the first connection by the first access point. The first access point and the second access point may both be connected to an access control device, and may have a same static address or a same Identity Resolving Key (IRK).

In some embodiments, in the aforementioned method, the preset condition may be that the mobile device is moving away from the first access point, and moving towards the second access point.

In some embodiments, in the aforementioned method, determining the moving direction of the mobile device may include: obtaining a first received signal strength indicator (RSSI) based on a first packet transmitted from the mobile device to the first access point; obtaining a second RSSI based on a second packet transmitted from the mobile device to the second access point; and determining the moving direction of the mobile device based on the first RSSI and the second RSSI.

In some embodiments, in the aforementioned method, obtaining a second RSSI may include: acquiring, by the second access point and from the access control device, connection information of the first connection, wherein the connection information may include connection parameters, an access code, and a frequency hopping pattern of the first connection; determining a communication window based on the connection information; receiving, by the second access point, a data package of the first connection within the communication window; and synchronizing a clock of the second access point with a clock of the first access point based on the data package of the first connection to enable the second access point to receive subsequent data packages of the first connection. The second RSSI may be determined based on the subsequent data packages of the first connection received by the second access point.

In some embodiments, in the aforementioned method, the establishing a second connection connecting the mobile device with the second access point may include: comparing the second RSSI with a signal threshold; in response to the second RSSI larger than the signal threshold, determining a connection anchor point; and establishing the second connection at the connection anchor point.

In some embodiments, in the aforementioned method, the connection anchor point may be associated with a frequency hopping sequence.

In some embodiments, the aforementioned method may further include: before determining the moving direction of the mobile device, setting, by the access control device, the static address of the second access point to be the same as the static address of the first access point. And the establishing a second connection connecting the mobile device with the second access point may include: establishing the second connection connecting the mobile device with the second access point based on the static address of the second access point.

In some embodiments, the aforementioned method may further include: before determining the moving direction of the mobile device, setting, by the access control device, the IRK of the second access point to be the same as the IRK of the first access point. And the establishing a second connection connecting the mobile device with the second access point may include: establishing the second connection connecting the mobile device with the second access point based on the IRK of the second access point.

In some embodiments, the aforementioned method may further include: after establishing the first connection, conducting a pairing procedure between the mobile device and the first access point to cause the first access point to distribute the IRK of the first access point or the static address of the first access point to the mobile device.

In some embodiments, in the aforementioned method, data packages of the first connection and data packages of the second connection may each go through an encryption procedure. The aforementioned method may further include: generating, by the first access point, an encryption key; and distributing, through the access control device, the encryption key to the second access point. The encryption procedures may be conducted based on the encryption key.

In some embodiments, the aforementioned method may further include: before disconnecting the first connection, pausing the encryption procedure for the data packages of the first connection; and, after establishing the second connection connecting the mobile device with the second access point, starting the encrypted procedure for the data packages of the second connection based on the encryption key.

Another aspect of this disclosure is directed to a wireless roaming system. The system may include a first access point; a second access point; and an access control device connected to the first access point and the second access point. The first access point and the second access point may have a same static address or a same IRK. The system may be configured to: determine a moving direction of a mobile device, wherein the mobile device may be in a first connection connecting with the first access point; and, in response to a determination that the moving direction meets a preset condition, establish a second connection connecting the mobile device with the second access point by the second access point; and disconnect the first connection by the first access point.

In some embodiments, in the aforementioned system, the preset condition may indicate that the mobile device is moving away from the first access point, and moving towards the second access point.

In some embodiments, to determine the moving direction of the mobile device, the aforementioned system may be configured to: obtain a first RSSI based on a first packet transmitted from the mobile device to the first access point; obtain a second RSSI based on a second packet transmitted from the mobile device to the second access point; and, based on the first RSSI and the second RSSI, determine the moving direction of the mobile device.

In some embodiments, to obtain the second RSSI, the aforementioned system may be configured to: acquire, by the second access point and from the access control device, connection information of the first connection, wherein the connection information may include connection parameters, an access code, and a frequency hopping pattern of the first connection; determine, based on the connection information, a communication window; receive, by the second access point, a data package of the first connection within the communication windows; and synchronize, based on the data package of the first connection, a clock of the second access point with a clock of the first access point to enable the second access point to receive subsequent data packages of the first connection. The second RSSI may be determined based on the subsequent data packages of the first connection received by the second access point.

In some embodiments, to establish the second connection connecting the mobile device with the second access point, the aforementioned system may be configured to: compare the second RSSI with a signal threshold; determine, in response to the second RSSI larger than the signal threshold, a connection anchor point; and establish the second connection at the connection anchor point.

In some embodiments, in the aforementioned system, the connection anchor point may be associated with a frequency hopping sequence.

In some embodiments, before determining the moving direction of the mobile device, the aforementioned system may be configured to: set, by the access control device, the IRK of the second access point to be the same as the IRK of the first access point. To establish a second connection connecting the mobile device with the second access point, the system may be configured to: establish, based on the IRK of the second access point, the second connection connecting the mobile device with the second access point.

Another aspect of this disclosure is directed to a non-transitory computer-readable storage medium storing a computer program. Upon being executed by a processor, the computer program may cause the processor to perform a wireless roaming method described in any one of the aforementioned method embodiments.

In the wireless roaming method disclosed herein, a moving direction of a mobile device may first be determined by the first access point and the second access point. When the moving direction meets a preset condition (e.g., when the moving direction indicates that the mobile device is moving away from the first access point and towards the second access point), the mobile device may switch its connected access point from the first access point to the second access point in a designated time window. Since all the access points are connected to an access control device, different access points may be coordinated by the access control device to determine the moving direction and, if necessary, to conduct the access point switch. Thus a seamless roaming of the mobile device may be achieved. Additionally, all the access points may be assigned either a same static address or a same IRK, and assigned a same encryption key, thereby ensuring the security and reliability of the wireless connection during the roaming.

These and other features of the systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various drawings. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings.

DETAILED DESCRIPTION

Specific, non-limiting embodiments of the present invention will now be described with reference to the drawings. Particular features and aspects of any embodiment disclosed herein may be used and/or combined with particular features and aspects of any other embodiment disclosed herein. It should be understood that such embodiments are by way of example and are merely illustrative of a number of embodiments within the scope of the present invention. Various changes and modifications obvious to one skilled in the art to which the present invention pertains are deemed to be within the spirit, scope and contemplation of the present invention as further defined in the appended claims.

Wireless roaming methods and associated wireless roaming systems will be described in details below. For ease of the description, in this disclosure, an example that is applicable to Bluetooth technology will be used to illustrate this invention. The invention may be applicable to other wireless connection technologies, including but not limited to, Wi-Fi connection, fourth generation (4G) cellular network connection, fifth generation (5G) cellular network connection, and this disclosure is not limited herein.

Figure 1:
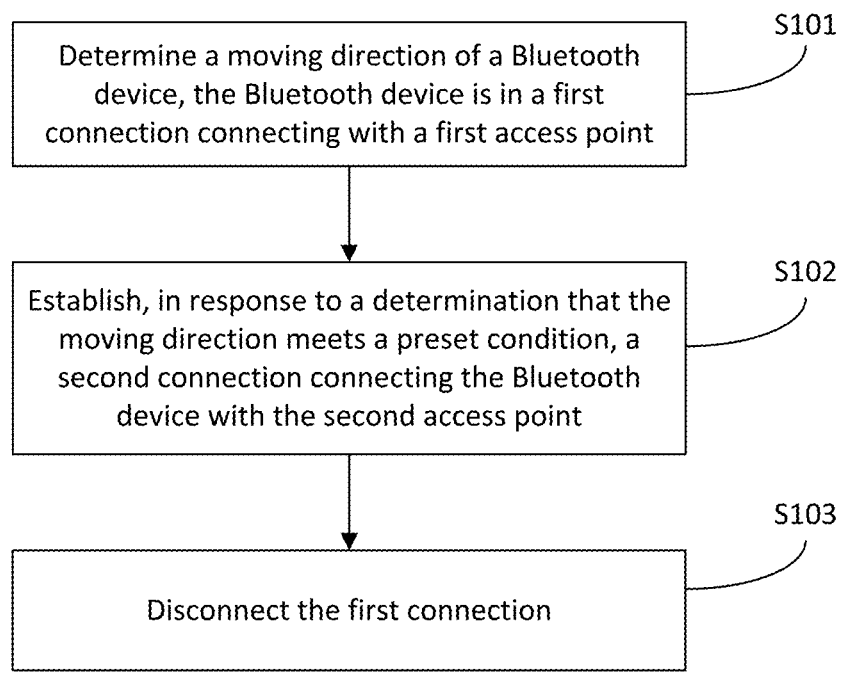
FIG. 1 is a flowchart illustrating a Bluetooth roaming method in accordance with one embodiment of this disclosure.

FIG. 1 shows a flowchart illustrating a Bluetooth roaming method in accordance with one embodiment of this disclosure. The Bluetooth roaming method may be applicable to a Bluetooth access control device. Referring to FIG. 1, the Bluetooth roaming method may include the following steps S101 through S103.

In step S101, a moving direction of a Bluetooth device may be determined. The Bluetooth device may be in a first connection connecting with a first access point. The moving direction may be determined based on a first access point and a second access point, specific steps of which will be described in greater details in a subsequent part of this disclosure.

In step S102, if the moving direction of the Bluetooth device is determined to meet a preset condition, a second connection connecting the Bluetooth device with the second access point may be established. Both the first access point and the second access point may be connected to an access control device.

Depending on the security requirement of the connections, a static address or a random address (also known as "random private resolvable address") generated based on an Identity Resolving Key (IRK) may be used for security verification of a connection between the Bluetooth device and an access point. In some embodiments, the static address may be used for security verification, and the access control device may coordinate the first access point and the second access point to use the same static address for roaming. Alternatively, in some embodiments, a random private resolvable address generated based on an IRK may be used for security verification, and the access control device may coordinate the first access point and the second access point to use the same IRK for roaming. The random private resolvable address generated with the IRK is verifiable by other devices with the same IRK, and may vary for each connection, which provides enhanced security over the static address.

In step S103, the first connection may be disconnected.

In this disclosure, the term "Bluetooth device" may refer to a device that is capable of establishing a Bluetooth connection with an access point. For example, a Bluetooth device may include, but not be limited to, a mobile phone, a laptop computer, a headphone, a navigation device, a tracking device, or a security camera. The term "access point" may refer to a device that is capable of creating a local Bluetooth network having a certain coverage area. A Bluetooth device within the local Bluetooth network may connect with the access point. For example, an access point may be a Bluetooth gateway. The term "access control device" may refer to a centralized control device that connects with one or more access points. An access control device may transmit data or instructions to and receive data or instructions from the one or more connected access points. In one example, an access control device may be a Bluetooth hub that connects to multiple Bluetooth gateways. The connection between an access control device and its access points may be a wired connection or a wireless connection.

Figure 2A:
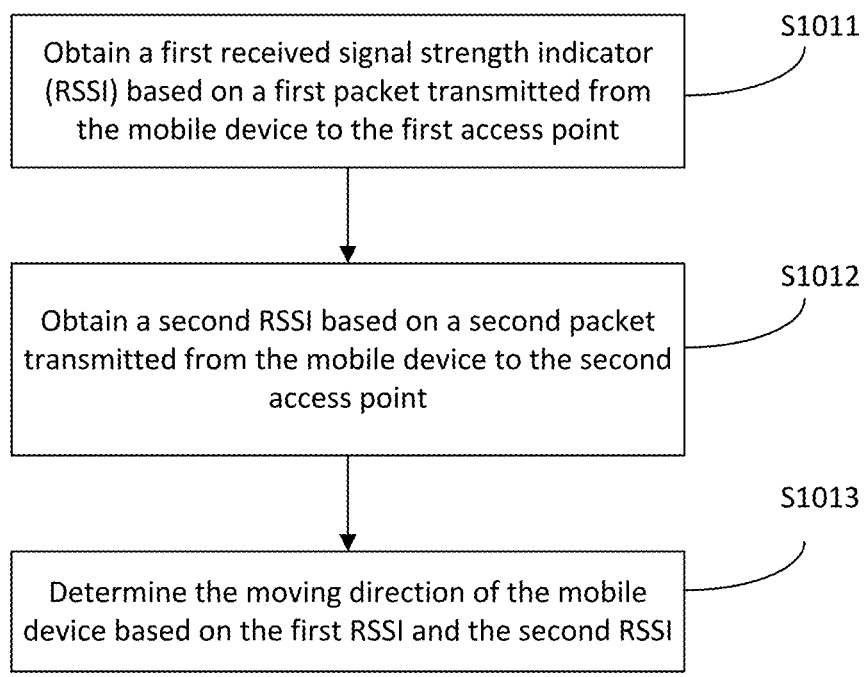
FIGS. 2A, 2B, and 3 are flowcharts illustrating detail steps of a Bluetooth roaming method in accordance with one embodiment of this disclosure.
Figure 2B:
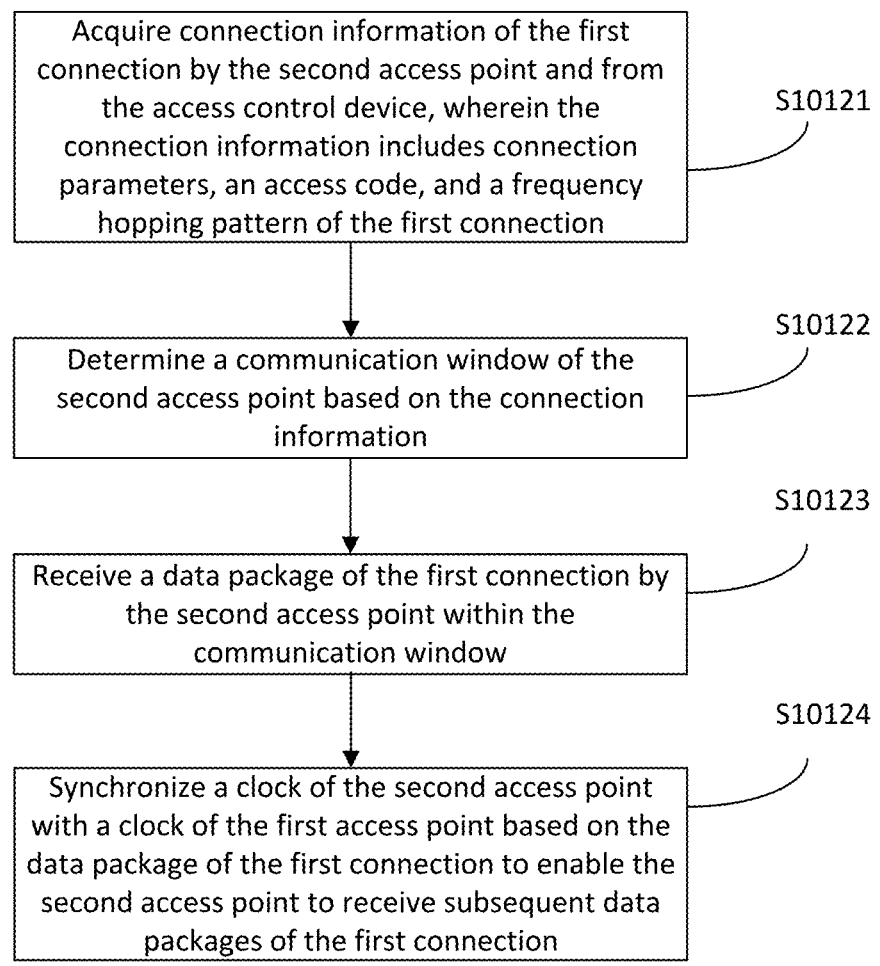
Figure 3:
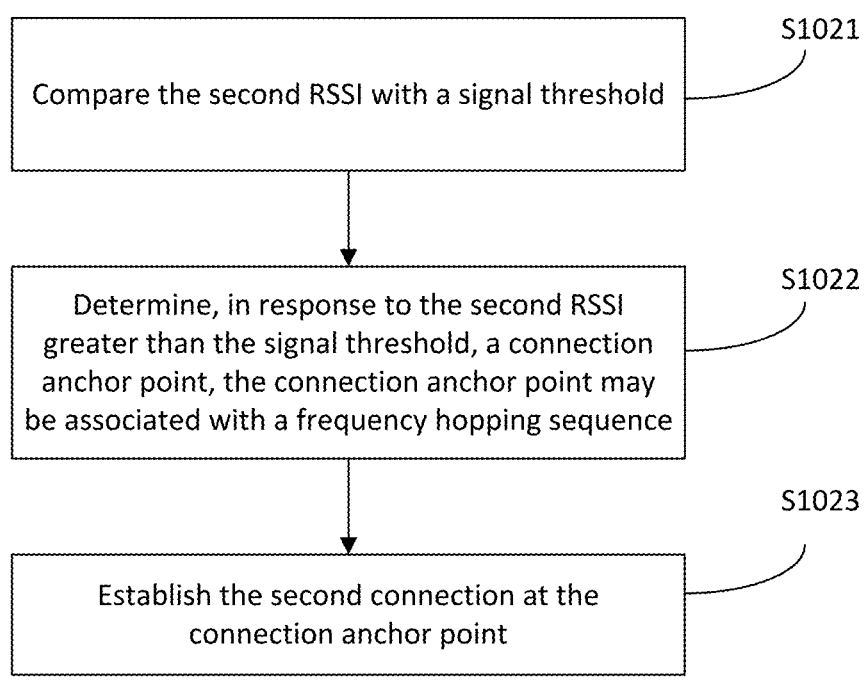
Figure 4:
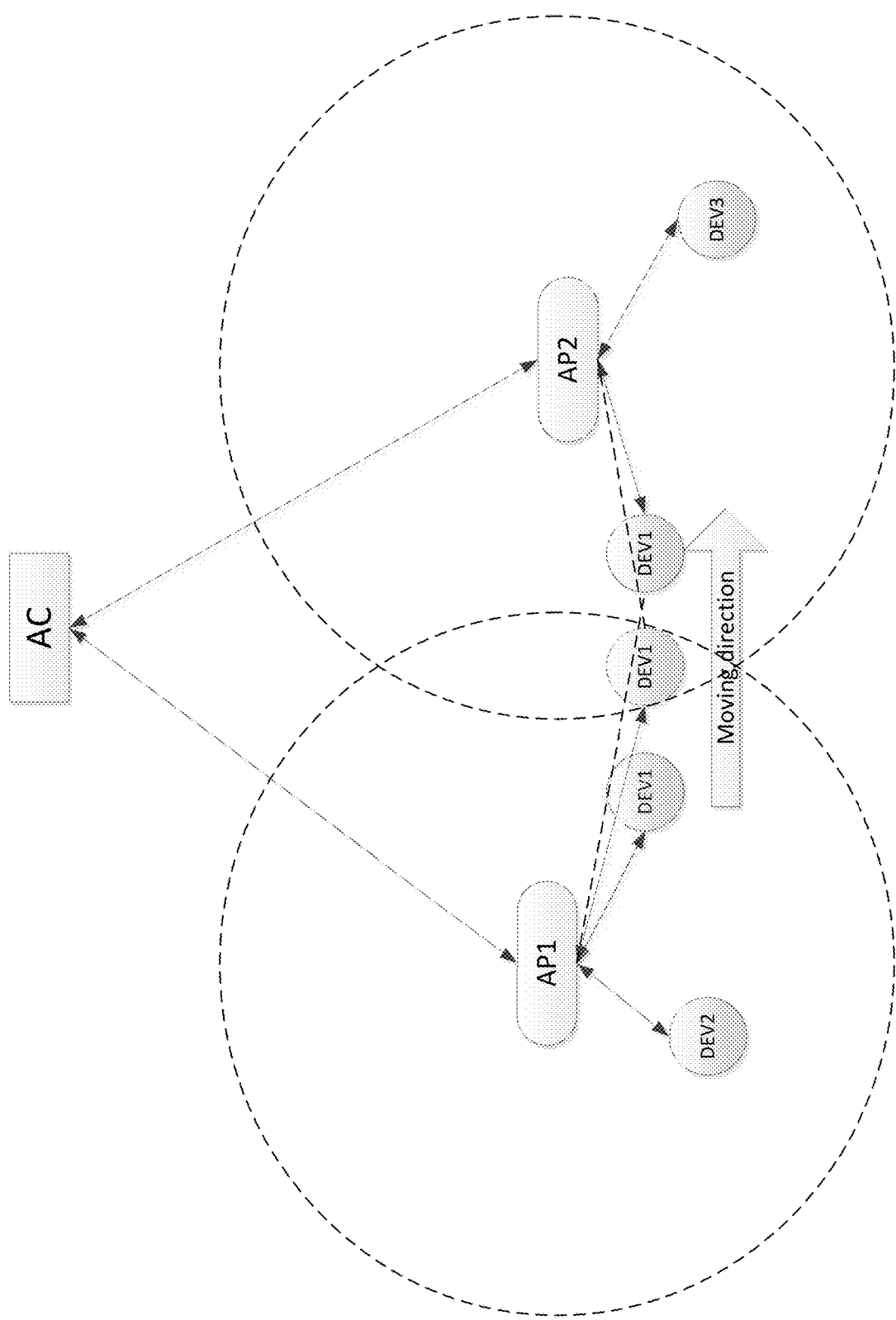
FIG. 4 shows a schematic diagram illustrating a roaming process of a Bluetooth device in accordance with one embodiment of this disclosure.

FIGS. 2A, 2B, and 3 show flowcharts illustrating detail steps of a Bluetooth roaming method in accordance with one embodiment of this disclosure. FIG. 4 shows a schematic diagram illustrating a roaming process of a Bluetooth device in accordance with one embodiment of this disclosure. Using the example illustrated in FIG. 4, the Bluetooth roaming method of this disclosure will be described below in greater details with reference to these drawings.

As shown in FIG. 4, a first access point AP1 and a second access point AP2 may each have a coverage area (e.g., labeled by dashed circles shown in FIG. 4). Each of the first access point AP1 and the second access point AP2 may be able to establish a Bluetooth connection with a Bluetooth device within its coverage area. Each of the first access point AP1 and the second access point AP2 may be connected with one or more Bluetooth devices. The first access point AP1 and the second access point AP2 may be connected to an access control device AC.

In the example shown in FIG. 4, a first device DEV1 may move from the coverage area of the first access point AP1 to the coverage area of the second access point AP2 (indicated by the arrow shown in FIG. 4). As shown in FIG. 4, neither the first access point AP1 or the second access point AP2 provides a coverage area covering the entire path of the first device DEV1. Therefore the first device DEV1 needs to connect to different access points during this process, and a Bluetooth roaming method needs to be implemented to ensure a secure and uninterrupted Bluetooth connection. The Bluetooth roaming method of this disclosure may include several steps that will be described below in details.

A. Determining a Moving Direction of the Bluetooth Device

The Bluetooth roaming method of this disclosure may include determining a moving direction of the first device DEV1. Since the Bluetooth signal strength on an access point is closely correlated to the distance between the Bluetooth device and the access point, the moving direction of the Bluetooth device may be determined based on Bluetooth signal strength on each of the access points.

For example, an increasing Bluetooth signal strength on an access point may indicate that the Bluetooth device is moving towards the access point, and a decreasing Bluetooth signal strength on an access point may indicate that the Bluetooth device is moving away from the access point. By analyzing the Bluetooth signal strengths on the access points, the moving direction of the Bluetooth device may be determined.

In some embodiments, the RSSI may be used to represent the signal strength on each of the access points, and the moving direction of the Bluetooth device may be determined based on the RSSI on each of the access points. For example, as shown in FIG. 4, a first RSSI (i.e., the RSSI on the first access point AP1) and a second RSSI (i.e., the RSSI on the second access point AP2) may be continuously measured to determine the moving direction of the first device DEV1. In this disclosure, "an RSSI on an access point" may be defined as an RSSI of a signal the access point received.

As shown in FIG. 2A, in one example, the moving direction of the first device DEV1 may be determined by the following operations S1011 through S1013.

In S1011, the first RSSI may be obtained based on a first packet transmitted from the first device DEV1 to the first access point AP1. The first packet may be a connection packet. In some embodiments, the first device DEV1 may be in a Bluetooth broadcasting status during the connection, and the first packet may be a broadcast packet.

In S1012, the second RSSI may be obtained based on a second packet transmitted from the first device DEV1 to the second access point AP2. The second packet may be a connection packet or a broadcast packet.

In S1013, the moving direction of the first device DEV1 may be determined based on the first RSSI and the second RSSI.

Depending on the connection status of the first device DEV1, the first RSSI and the second RSSI may be obtained in different ways. In some embodiments, the first device DEV1 may be in the Bluetooth broadcasting status and may be broadcasting broadcast packets that can be received by the first access point AP1 and the second access point AP2. In that case, the moving direction of the first device DEV1 may be determined based on the broadcast packets the first access point AP1 and the second access point AP2 received. For example, if the RSSIs of the packets the first access point AP1 received (i.e., the first packet) are decreasing, and the RSSIs of the broadcast packets the second access point AP2 received (i.e., the second packet) are increasing, it may be determined that the first device DEV1 is moving away from the first access point AP1 and towards the second access point AP2.

In some embodiments, the first device DEV1 may have already established a Bluetooth connection (i.e., the first connection) with the first access point AP1, and may no longer transmit any broadcast packet. According to the Bluetooth protocol, the first connection is regulated by an access code and a frequency hopping pattern, and therefore is not "visible" by other devices. However, since the first access point AP1 and the second access point AP2 are both connected to the access control device AC, the second access point AP2 may acquire connection information of the first connection through the access control device AC, and then receive the data packages of the first connection based on the connection information. In some embodiments, a RSSI threshold may be set. When the first RSSI drops lower than the RSSI threshold, indicating the first device DEV1 is sufficiently away from the first access point AP1, the first access point AP1 may send, through the access control device AC, a notification to the second access point AP2 for the second access point AP2 to start monitoring the second RSSI. Thus, the second access point AP2 will only begin to monitor the second RSSI when the first device DEV1 is sufficiently far away from the first access point AP1, thereby saving the power consumption of the second access point AP2.

As shown in FIG. 2B, the Bluetooth roaming method of this disclosure, the second RSSI may be obtained through the following operations S10121 through S10124.

In S10121, the second access point AP2 may acquire the connection information of the first connection from the access control device AC. The connection information may include one or more of connection parameters, the access code, and the frequency hopping pattern of the first connection.

In S10122, based on the connection information, a communication window for the second access point AP2 may be determined. The communication window of the second access point AP2 may be a specific time window in which the second access point AP2 may be able to receive a data package of the first connection, which is sent between the Bluetooth device and the first access point AP1. The communication window of the second access point AP2 may be determined by the second access point AP2 based on factors including, but not limited to, the locations of the first access point AP1 and the second access point AP2, the connection information of the first connection, etc. In some embodiments, when determining the communication window of the second access point AP2, network delay may be taken into consideration to further improve the accuracy, and the communication window of the second access point AP2 may be obtained by delaying the communication window of the first access point AP1 (i.e., a time window in which the first access point AP1 receives a data package of the first connection, which may be computed based on the connection information of the first connection) by a certain amount of time (e.g., a few hundred milliseconds).

In S10123, after the communication window has been determined, the second access point AP2 may receive a data package of the first connection within the communication window.

In S10124, based on the data package of the first connection, the clock of the second access point AP2 may be synchronized with the clock of the first access point AP1. The clock should be synchronized to a precision high enough to allow the second access point AP2 to receive data packages of the first connection based on the synchronized clock. Existing clock synchronization methods may be used to synchronize the clock, and this disclosure is not limited in this regard. With a synchronized clock, the second access point AP2 may be able to receive subsequent data packages of the first connection. The second RSSI may be determined based on the data packages of the first connection received by the second access point AP2, and the moving direction of the first device DEV1 may be determined based on the first RSSI and the second RSSI.

It should be noted that at this operation, the second access point AP2 has not established a Bluetooth connection with the first device DEV1, and therefore does not actively send any data package to the first device DEV1. It should be understood that, other than relying on the RSSI on the access points, the moving direction of the first device DEV1 may be determined by other suitable methods, and this disclosure is not limited in this regard.

In the Bluetooth roaming method of this disclosure, when the moving direction of the first device DEV1 meets a preset condition, the access point connects with the first device DEV1 may be switched. That is, the second connection connecting the first device DEV1 with the second access point AP2 may be established, and the first connection connecting the first device DEV1 with the first access point AP1 may be disconnected. In this disclosure, the aforementioned process of establishing a connection with a new access point and to disconnecting an existing connection from an existing access point may be referred to as "access point switch".

In some embodiments, the preset condition for the access point switch may indicate that the first device DEV1 is moving away from the first access point AP1 and moving towards the second access point AP2, indicating that the first device DEV1 is leaving the coverage area of the first access point AP1 and entering the coverage area of the second access point AP2. Other than the moving direction of the first device DEV1, other characteristics of the first device DEV1, the first access point AP1, and the second access point AP2 may be used to determine whether the access point needs to be switched. For example, factors such as device position, device speed, access point preference, or a combination thereof may be used to determine whether the access point needs to be switched, and this disclosure is not limited in this regard.

B. Access Point Switch

As described above, in the Bluetooth roaming method of this disclosure, an access point switch of the first device DEV1 may include establishing the second connection connecting with the second access point AP2 and disconnecting the first connection connecting with the first access point AP1. As shown in FIG. 3, establishing the second connection connecting with the second access point AP2 may include the following operations S1021 through S1023.

In S1021, a second RSSI may be compared with a signal threshold. The access point may be switched when the second RSSI is greater than the signal threshold. In some embodiments, the signal threshold may be set so that the access point will be switched when the distance between the first device DEV1 and the second access point AP2 is sufficiently close (e.g., less than a distance threshold).

In S1022, when the second RSSI is greater than the signal threshold, a connection anchor point may be determined. In one example, the connection anchor point may be associated with a frequency hopping sequence. In this application, the term "anchor point" may refer to a start time of a connection event.

In S1023, the second connection may be established at the connection anchor point.

Figure 5:
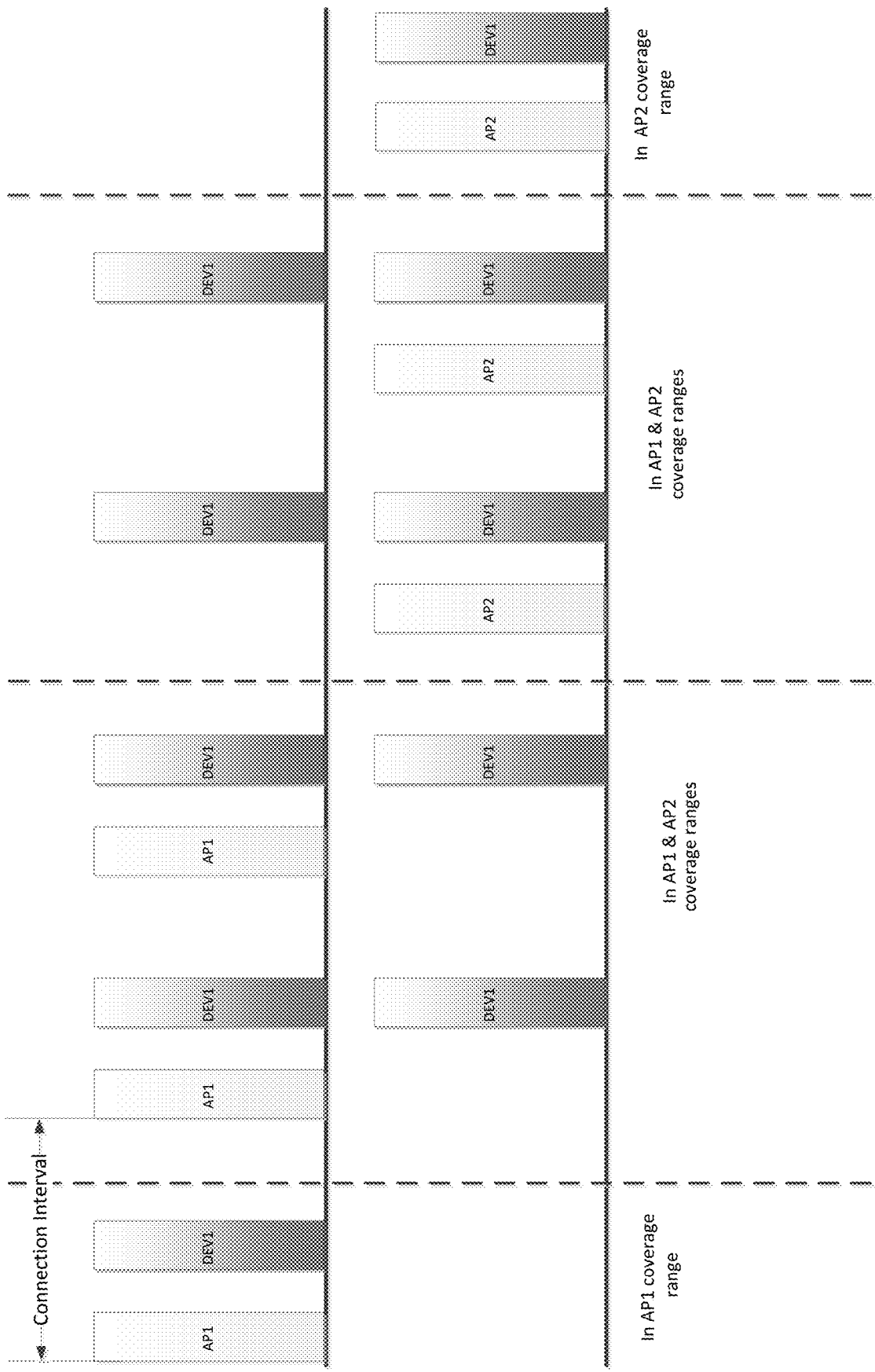
FIG. 5 shows a schematic diagram illustrating access point switch in a Bluetooth roaming method in accordance with one embodiment of this disclosure.

FIG. 5 shows a schematic diagram illustrating details of an access point switch in a Bluetooth roaming method in accordance with one embodiment of this disclosure. The access point switch will be described below in greater details with reference to FIGS. 4 and 5.

As shown in FIG. 4, the first device DEV1 may initially in an area where only the first access point AP1 has a coverage (corresponding to the left-most DEV1 in FIG. 4), and only the first access point AP1 is able to connect with the first device DEV1. The connection of the first device DEV1 in this area may be illustrated by the left-most region (i.e., the region marked with "In AP1 coverage range") of FIG. 5.

As the first device DEV1 moves towards the second access point AP2, the first device DEV1 may enter an overlapped area of the coverage areas of the first access point AP1 and the second access point AP2 (the overlap region of two dashed circles in FIG. 4), and both the first access point AP1 and the second access point AP2 may connect with the first device DEV1 at the overlapped area. In some embodiments, a signal threshold may be set on the basis that the access point switch may be performed while the first device DEV1 is in the overlapped area.

While the first device DEV1 is in the overlapped area, when the second RSSI is larger than the signal threshold, the connection anchor point may be determined, and the second connection connecting the first device DEV1 and the second access point AP2 may be established at the connection anchor point. In some embodiments, the connection anchor point may be determined according to a known frequency hopping sequence. For example, the connection anchor point may be at one of subsequent frequency hopping sequences. Starting from that frequency hopping sequence, the second access point AP2 may begin to communicate with the first device DEV1, thus establishing the second connection. The first access point AP1 may stop communicating with the first device DEV1 at a specified time, thereby disconnecting the first connection. The connection of the first device DEV1 in the overlap area may be illustrated by the central regions (i.e., the region marked with "In AP1 & AP2 coverage ranges") of FIG. 5.

It should be understood that, in the example shown in FIG. 5, the first connection is disconnected before the second connection has been established. This disclosure, however, is not limited in this regard. In some embodiments, the first connection may be disconnected after, or simultaneously with, the establishment of the second connection.

As the first device DEV1 continues to move towards the second access point AP2, the first device DEV1 may leave the overlapped area and enter an area where only the second access point AP2 has coverage (corresponding to the right-most DEV1 in FIG. 4). The connection of the first device DEV1 at this area may be illustrated by the right-most region (i.e., the region marked with "In AP2 coverage range") of FIG. 5.

C. Unified Address

Some Bluetooth devices may record an address of the access point it connected with, and use the address for security verification of the connection. For these Bluetooth devices, a connection to a new device (e.g., an access point) that has an address not been previously registered or verified may be denied. To address this issue, the Bluetooth roaming method of this disclosure may further include steps to distribute a unified address across multiple devices in the network.

In some embodiments, the static address may be used for security verification of a connection, and the same static address may be distributed to multiple devices (e.g., access points) in the network. In some embodiments, for enhanced security, the random private resolvable address generated based on the IRK may be used for security verification, and the same IRK may be distributed to multiple devices (e.g., access points) in the network.

Figure 6A:
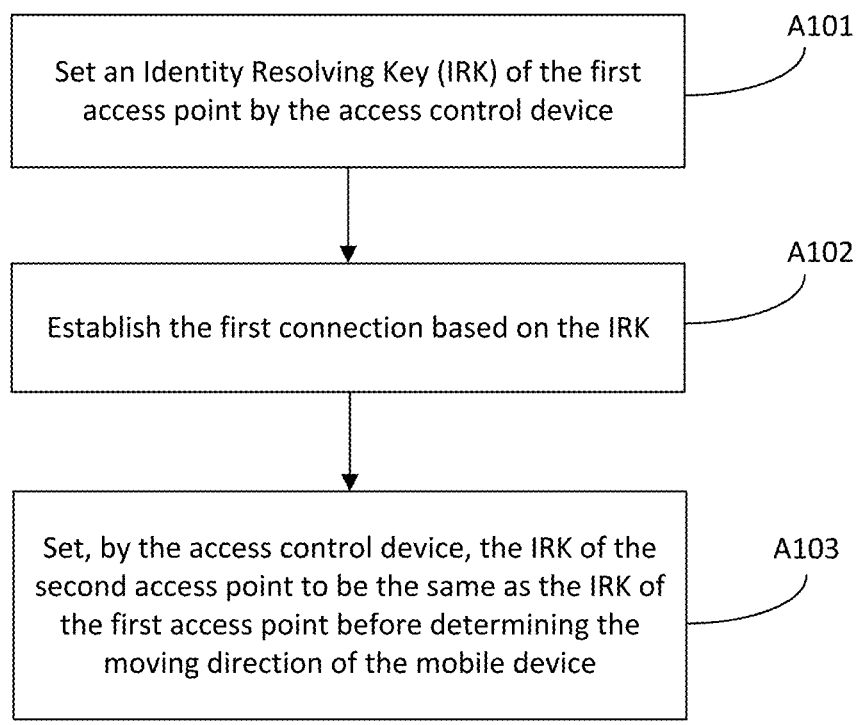
FIG. 6A shows a flowchart illustrating detail steps of setting unified addresses in a Bluetooth roaming method in accordance with one embodiment of this disclosure.
Figure 6B:
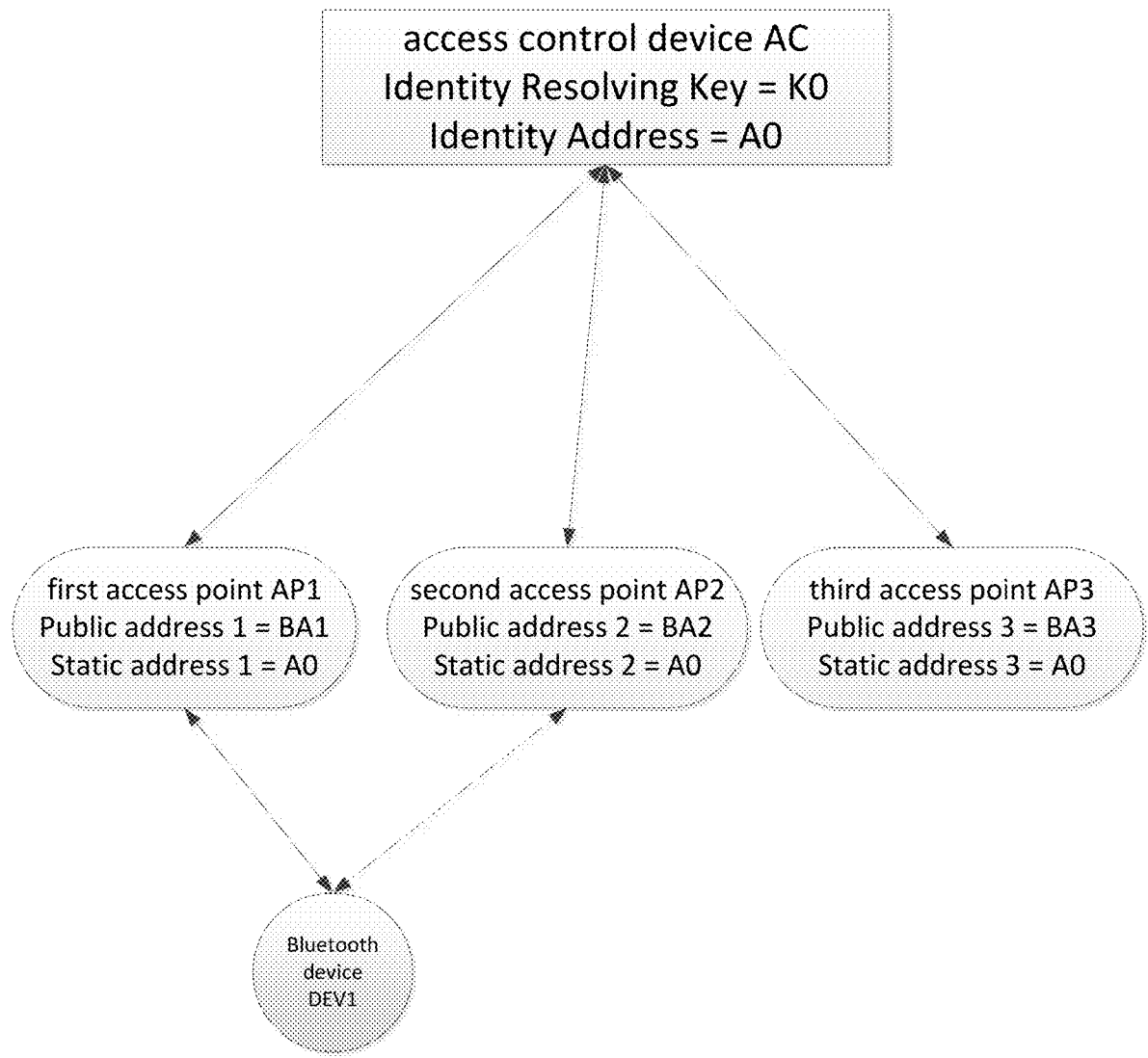
FIG. 6B shows a schematic diagram illustrating unified addresses of various devices in a Bluetooth roaming method in accordance with one embodiment of this disclosure.

FIG. 6A shows a flowchart illustrating detail steps of setting unified addresses in a Bluetooth roaming method in accordance with one embodiment of this disclosure. FIG. 6B shows a schematic diagram illustrating unified addresses of various devices in a Bluetooth roaming method in accordance with one embodiment of this disclosure. The steps to distribute unified address will be described in greater detail below with reference to these drawings. In this application, the term "address" may refer to an identifier assigned to the device for communications between the devices. As described below, the "address" may be a static address or an IRK, depending on the security verification method used. This disclosure, however, is not limited herein, and the "address" may be other identifier that can be used for security verification of a connection.

As shown in FIG. 6A, in some embodiments, the Bluetooth roaming method of this disclosure may further include steps of setting unified address (e.g., IRK), which may include the following operations A101 through A103.

In A101, an IRK of the first access point AP1 may be set. The setting of the IRK of the first access point AP1 may be performed by the access control device AC when the Bluetooth device (e.g., the first device DEV1) enters the coverage area of the first access point AP1.

In A102, when the Bluetooth device enters the coverage area of the first access point AP1, the first connection connecting the Bluetooth device with the first access point AP1 may be established based on the IRK of the first access point AP1. In this step, the Bluetooth device may receive the same IRK. Based on the IRK, the first access point may generate a random private resolvable address based on the IRK, which can be verified by the Bluetooth device with the same IRK to allow the connection being established.

In A103, the access control device AC may set the IRK of the second access point AP2 to be the same as the IRK of the first access point AP1 before determining the moving direction of the Bluetooth device (i.e., the first device DEV1). The access control device AC may transmit the same IRK to the first access point AP1 and the second access point AP2, and the IRK may be transmitted to each access point and the Bluetooth device in a secure manner.

In the example shown in FIG. 6A, the IRK is used for security verification of a connection. In other examples, the static address may be used for security verification of a connection. In these examples, the steps to set unified address (i.e., static address) may include: setting a static address of the first access point AP1 by the access control device AC; establishing the first connection based on the static address; and setting, by the access control device AC, the static address of the second access point AP2 to be the same as the static address of the first access point AP1 before determining the moving direction of the mobile device (i.e., the first device DEV1). The static address may be set following the same detail procedures described above for setting the IRK, and these detail procedures will not be repeatedly presented herein for the sake of conciseness.

FIG. 6B shows a schematic diagram illustrating unified address of various devices in a Bluetooth roaming method in accordance with one embodiment of this disclosure.

As shown in FIG. 6B, in some embodiments, the security verification of a connection may be conducted based on the static address of the connecting device, thus the access control device AC may first set an identity address, and set the static address of the second access point AP2 and the static address of the first access point AP1 to be the same as the identity address (e.g., "A0" in FIG. 6B), thereby ensuring a reliable access point switch. In some embodiments, the security verification of a connection may be conducted based on the random private resolvable address generated based on the IRK of the connecting device, thus the access control device AC may set the IRK of the second access point AP2 to be the same as the IRK of the first access point AP1 (not shown in FIG. 6B). The connection to each access point may be established based on the random private resolvable address generated based on the IRK.

In some embodiments, more than two access points may be provided in the network, and all of these access points may be assigned the same static address or the same IRK. For example, as shown in FIG. 6B, in addition to the first access point AP1 and the second access point AP2, a third access point AP3 may be connected to the access control device AC, and all these three access points may be assigned the same static address ("A0" in FIG. 6B) or the same IRK (not shown).

The static addresses and the IRK of the access points may also be set according to other suitable protocols, and this disclosure is not limited in this regard.

D. Sharing of Encryption Keys

Figure 7:
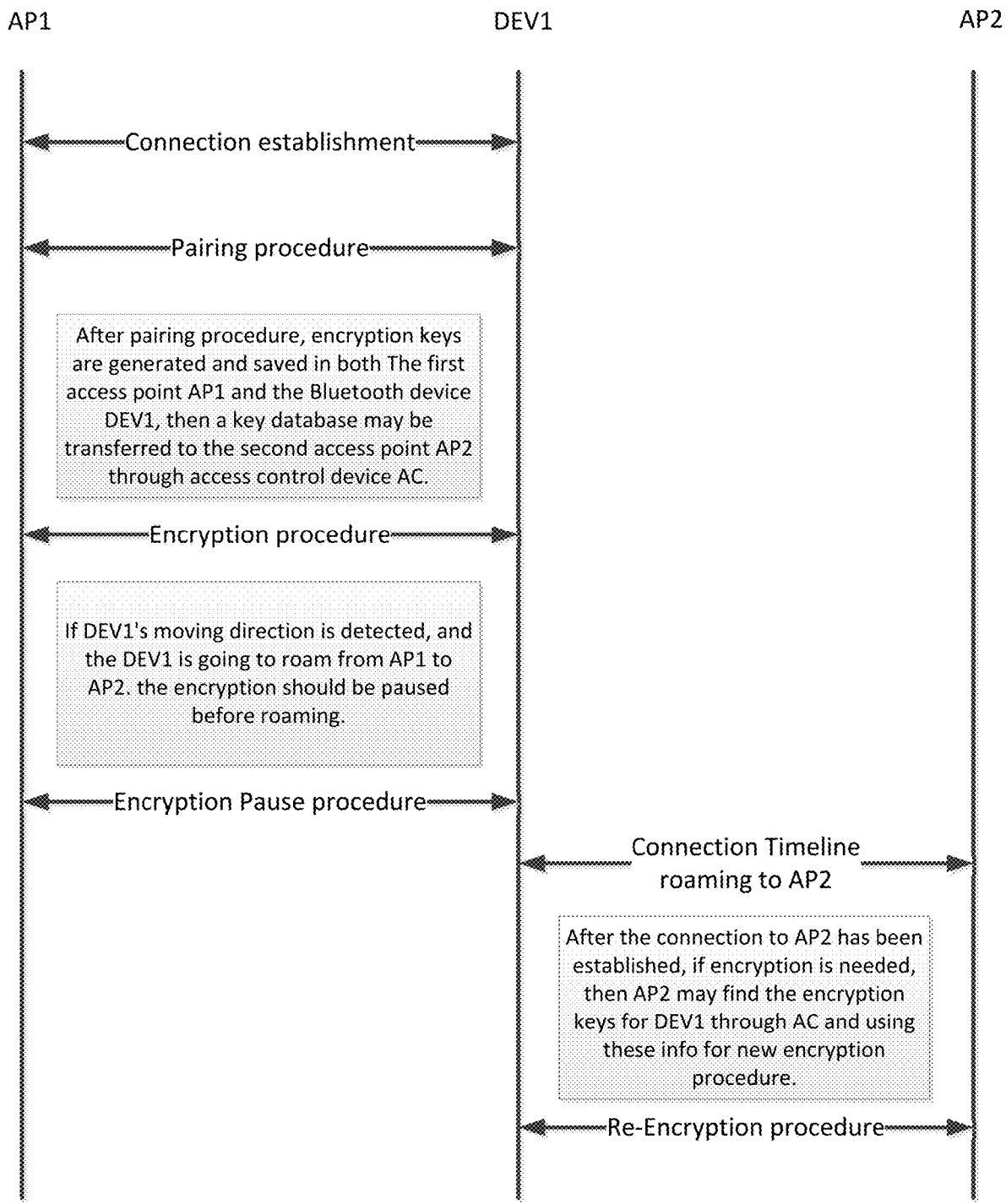
FIG. 7 shows a schematic diagram illustrating a pairing procedure and an encryption procedure in a Bluetooth roaming method in accordance with one embodiment of this disclosure.

In some embodiments, a Bluetooth device may be paired with an access point and subsequent communication between them may need to be encrypted for enhanced security. The Bluetooth roaming method of this disclosure further provides steps to accommodate for the encrypted communication during the roaming process. FIG. 7 shows a schematic diagram illustrating a pairing procedure and an encryption procedure in a Bluetooth roaming method in accordance with one embodiment of this disclosure.

As shown in FIG. 7, in some embodiments, the Bluetooth roaming method of this disclosure may further include: after establishing the first connection connecting the Bluetooth device DEV1 and the first access point AP1, conducting a pairing procedure between the Bluetooth device DEV1 and the first access point AP1. During a key distribution stage of the pairing procedure, the first access point AP1 may distribute encryption key to the Bluetooth device, access points, and access control device, so that subsequent encryption procedure between the Bluetooth device and any other access point may be properly conducted based on the encryption key.

More specifically, in the example shown in FIG. 4, the encryption keys may be generated by the first access point AP1, and be distributed, through the access control device AC and in a secure manner, to the second access point AP2 and, in some embodiments, to the first device DEV1. That is, the Bluetooth roaming method may further include: after the pairing procedure between the Bluetooth device and the first access point AP1 is completed, generating, by the first access point AP1, an encryption key; and distributing, through the access control device AC, the encryption key to the second access point AP2. The encryption key may be distributed in a secure manner using existing secure data transmission method, and this disclosure is not limited in this regard.

The encryption procedures for the data packages of the first connection and the data packages of the second connection may be conducted based on the encryption key. After the pairing procedure, encryption keys may be generated by the first access point AP1, and be transmitted to and saved in the first access point AP1, the second access point AP2, and the first device DEV1.

The encryption key for each of the access points, the Bluetooth device, and the access control device may be same or different. In some embodiment, a database storing all the encryption keys may be created, and the access control device may distribute the database or the encryption keys in a secure manner to each of the access points when the connection with each respective access point is established.

In some embodiments, data packages in the first connection and the second connection may go through an encryption procedure. The encryption procedure may require additional steps when establishing a connection with a new access point. To ensure the connection of the Bluetooth device can be successfully switched between different access points during the roaming process, the Bluetooth roaming method of this disclosure may further include: before switching the access point (i.e., before establishing the second connection, and disconnecting the first connection), pausing the encryption procedure for the data packages of the first connection. The encryption may be paused by one or more known instructions. For example, instructions LL_PAUSE_ENC_REQ and LL_PAUSE_ENC_RSP in BLE link layer may be used to pause the encryption procedure. The encryption procedure may be paused by other suitable methods, and this disclosure is not limited in this regard.

The Bluetooth roaming method may further include: after establishing the second connection connecting the Bluetooth device with the second access point AP2, starting the encryption procedure for the data packages of the second connection. The second access point AP2 may use the encryption key distributed by the access control device AC to start the encryption procedure for the data packages.

In the Bluetooth roaming method disclosed herein, the first access point AP1 and the second access point AP2 may first determine a moving direction of a Bluetooth device. When the moving direction meets a preset condition (e.g., when the preset condition indicates that the Bluetooth device is moving away from the first access point AP1 and moving towards the second access point AP2), the access point connected to the Bluetooth device may be switched in a designated time window. Since all the access points are connected to an access control device, the access control device may coordinate different access points to determine the moving direction and, when necessary, to conduct access point switch. Thus, a seamless roaming of the Bluetooth device can be achieved. Additionally, all the access points may be assigned the same static address or the same IRK for security verification, and be assigned the same encryption key for data encryption, thereby ensuring the security and reliability of the Bluetooth connection during the roaming.

It should be noted that in the aforementioned embodiment, the Bluetooth roaming method is described with examples of two access points. This disclosure, however, is not limited herein, and the Bluetooth roaming method may be applicable to the applications that include more than two access points (e.g., three, four, or more access points). Additionally, each access point may be connected to more than one Bluetooth devices. For example, as shown in FIG. 4, other than the first device DEV1, the first access point AP1 may also be connected to a second device DEV2, and the second access point AP2 may also be connected to a third device DEV3. The Bluetooth roaming method described above may be applicable to the roaming of two or more Bluetooth devices, simultaneously or sequentially. This disclosure is not limited in this regards.

This disclosure further presents a Bluetooth roaming system for performing the aforementioned Bluetooth roaming method. The system may include: a first access point; a second access point; and an access control device connected to the first access point and the second access point. The first access point and the second access point may have the same static address or the same IRK. The system may be configured to: determine a moving direction of a Bluetooth device that is in a first connection with the first access point; and, in response to a determination that the moving direction meets a preset condition, establish a second connection connecting the Bluetooth device with the second access point; and disconnect the first connection.

In some embodiments, the preset condition may indicate that the Bluetooth device is moving away from the first access point, and moving towards the second access point.

In some embodiments, to determine the moving direction of the Bluetooth device, the system may be configured to: obtain a first RSSI based on a first packet transmitted from the Bluetooth device to the first access point; obtain a second RSSI based on a second packet transmitted from the Bluetooth device to the second access point; and determine the moving direction of the Bluetooth device based on the first RSSI and the second RSSI. Here, the first RSSI may refer to the RSSI on the first access point, and the second RSSI may refer to the RSSI on the second access point. The first packet may be a connection packet. In some embodiments, the Bluetooth device may be broadcasting during connection, and the first packet may be a broadcast packet.

In some embodiments, to obtain the second RSSI, the system may be configured to: acquire, by the second access point, connection information of the first connection through the access control device; determine a communication window based on the connection information; receive, by the second access point, a data package of the first connection within the communication window; and synchronize a clock of the second access point with a clock of the first access point based on the data package of the first connection to enable the second access point to receive subsequent data packages of the first connection. The connection information may include connection parameters, an access code, and a frequency hopping pattern of the first connection. The second RSSI may be determined based on the data packages of the first connection received by the second access point.

In some embodiments, to establish the second connection connecting the Bluetooth device with the second access point, the system may be configured to: compare the second RSSI with a signal threshold; determine, in response to the second RSSI larger than the signal threshold, a connection anchor point; and establish the second connection at the connection anchor point.

In some embodiment, the connection anchor point may be associated with a frequency hopping sequence. For example, the connection anchor point may be one of subsequent frequency hopping sequences.

In some embodiments, before determining the moving direction of the Bluetooth device, the system may be further configured to set, by the access control device, the static address of the second access point to be the same as the static address of the first access point. To establish the second connection connecting the Bluetooth device with the second access point, the system may be configured to establish, based on the static address of the second access point, the second connection connecting the Bluetooth device with the second access point.

In some embodiments, the same static address may be assigned by the access control device to all access points, and the connection to each access point may be established based on the static address. Since all the access points have the same static address, these access points may be recognized by the Bluetooth device as a same device, thereby ensuring seamless roaming across different access points.

In some embodiments, before determining the moving direction of the Bluetooth device, the system may be further configured to set, by the access control device, the IRK of the second access point to be the same as the IRK of the first access point. To establish the second connection connecting the Bluetooth device with the second access point, the system may be configured to establish, based on the IRK of the second access point, the second connection connecting the Bluetooth device with the second access point.

In some embodiments, the same IRK may be assigned by the access control device to all access points. Based on the IRK, a random private resolvable address may be generated for each access point, which is verifiable by other devices with the same IRK. The connection to each access point may be established based on the random private resolvable address. The Bluetooth device may receive the same IRK when it first connects to the network, therefore it may verify the random private resolvable address generated by the access points with the same IRK. Since all the access points have the same IRK, they may be recognized by the Bluetooth device as a same device, thereby ensuring seamless roaming across different access points.

In some embodiments, after the first connection has been established, the system may be further configured to conduct a pairing procedure between the Bluetooth device and the first access point, to cause the first access point to distribute the IRK of the first access point or the static address of the first access point to the Bluetooth device.

In some embodiments, data packages of the first connection and data packages of the second connection may each go through an encryption procedure, and the system may be further configured to generate, by the first access point, an encryption key; and distribute, through the access control device, the encryption key to the second access point. The encryption procedures may be conducted based on the encryption key.

In some embodiments, before the first connection is disconnected, the system may be further configured to pause the encryption procedure for the data packages of the first connection; and, after the second connection connecting the Bluetooth device with the second access point has been established, start, based on the encryption key, the encryption procedure for the data packages of the second connection.

The Bluetooth roaming system may perform the Bluetooth roaming methods described in any of the aforementioned method embodiments, and therefore relevant parts in the description for aforementioned method embodiments may be referred to for details on the Bluetooth roaming method, which will not be repeatedly described herein for the sake of conciseness.

This disclosure further provides a non-transitory computer-readable storage medium storing a computer program executable by a processor. Upon being executed by the processor, the computer program may cause the processor to perform the Bluetooth roaming method described in any one of the aforementioned embodiments.

Figure 8:
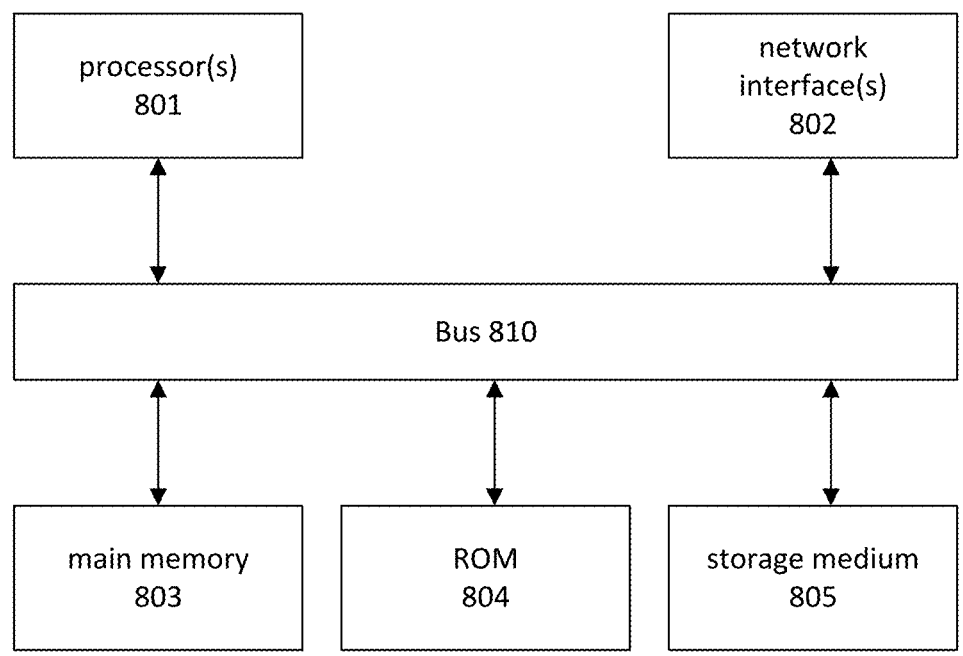
FIG. 8 shows a schematic diagram illustrating a computer system upon which any of the embodiments described herein may be implemented.

FIG. 8 shows a schematic diagram illustrating a computer system upon which any of the embodiments described herein may be implemented. Various devices described in this disclosure, such as devices associated with the first access point AP1, the second access point AP2, the access control device AC, may be at least partially implemented as such a computer system 800. The computer system 800 may include a Bus 810 or other communication mechanism for communicating information, one or more hardware processors 801 coupled with the Bus 810 for processing information. Hardware processor(s) 801 may be, for example, one or more general purpose microprocessors.

The computer system 800 may also include a main memory 803, such as a random access memory (RAM), cache and/or other dynamic storage devices, coupled to the Bus 810 for storing information and instructions to be executed by processor(s) 801. Main memory 803 may be used for storing temporary variables or other intermediate information during execution of instructions to be executed by processor(s) 801. Such instructions, when stored in storage media accessible to processor(s) 801, render computer system 800 into a special-purpose machine that is customized to perform the operations specified in the instructions. For example, upon being executed by the processor(s) 801, the instructions may cause the processor(s) 801 to perform the Bluetooth roaming method described in any of the aforementioned embodiments.

Main memory 803 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 801 executing one or more sequences of one or more instructions contained in main memory 803. Such instructions may be read into main memory 803 from another storage medium, such as a storage medium 805. Execution of the sequences of instructions contained in main memory 803 causes processor(s) 801 to perform the process steps described herein.

The computer system 800 also includes a network interface 802 coupled to the Bus 810. The network interface 802 may provide a two-way data communication coupling to one or more network links that are connected to one or more networks. In another example, the network interface 802 may be a local area network (LAN) card to provide a data communication connection to a compatible LAN (or WAN component to communicated with a WAN). Wireless links may also be implemented.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. A wireless roaming method, applicable to an access control device, the method comprises:
    setting, by the access control device, an Identity Resolving Key (IRK) of a first access point to be the same as an IRK of a second access point;
    determining a moving direction of a mobile device, wherein the mobile device is in a first connection connecting with the first access point;
    establishing, by the second access point and in response to a determination that the moving direction meets a preset condition, a second connection connecting the mobile device with the second access point, by:
        establishing, based on the IRK of the second access point, the second connection connecting the mobile device with the second access point; and
    disconnecting, by the first access point, the first connection, wherein the first access point and the second access point are both connected to the access control device.

2. The method of claim 1, wherein the preset condition indicates that the mobile device is moving away from the first access point, and moving towards the second access point.

3. The method of claim 1, wherein the determining a moving direction of the mobile device comprises:
obtaining, based on a first packet transmitted from the mobile device to the first access point, a first received signal strength indicator (RSSI);
obtaining, based on a second packet transmitted from the mobile device to the second access point, a second RSSI; and
determining, based on the first RSSI and the second RSSI, the moving direction of the mobile device.

4. The method of claim 3, wherein the obtaining a second RSSI comprises:
acquiring, by the second access point and from the access control device, connection information of the first connection, wherein the connection information includes connection parameters, an access code, and a frequency hopping pattern of the first connection;
determining, based on the connection information, a communication window;
receiving, by the second access point, a data package of the first connection within the communication window; and
synchronizing, based on the data package of the first connection, a clock of the second access point with a clock of the first access point to enable the second access point to receive subsequent data packages of the first connection, wherein the second RSSI is determined based on the subsequent data packages of the first connection received by the second access point.

5. The method of claim 4, wherein the establishing a second connection connecting the mobile device with the second access point device comprises:
comparing the second RSSI with a signal threshold;
determining, in response to the second RSSI greater than the signal threshold, a connection anchor point; and
establishing, at the connection anchor point, the second connection.

6. The method of claim 5, wherein the connection anchor point is associated with a frequency hopping sequence.

7. The method of claim 1, further comprising: after establishing the first connection, conducting a pairing procedure between the mobile device and the first access point, to cause the first access point to distribute the IRK of the first access point to the mobile device.

8. The method of claim 7, wherein data packages of the first connection and data packages of the second connection each go through an encryption procedure, and wherein the method further comprises:
generating, by the first access point, an encryption key; and
distributing, through the access control device, the encryption key to the second access point, wherein the encryption procedures are conducted based on the encryption key.

9. The method of claim 8, further comprising: before disconnecting the first connection,
pausing the encryption procedure for the data packages of the first connection; and
after establishing the second connection connecting the mobile device with the second access point, starting, based on the encryption key, the encryption procedure for the data packages of the second connection.

10. A wireless roaming system, comprising:
a first access point;
a second access point; and
an access control device connected to the first access point and the second access point, wherein the system is configured to:
set, by the access control device, the IRK of the second access point to be the same as the IRK of the first access point,
determine a moving direction of a mobile device, wherein the mobile device is in a first connection connecting with the first access point;
establish, by the second access point and in response to a determination that the moving direction meets a preset condition, a second connection connecting the mobile deice with the second access point, by
establishing, based on the IRK of the second access point, the second connection connecting the mobile device with the second access point; and
disconnect, by the first access point, the first connection.

11. The system of claim 10, wherein the preset condition indicates that the mobile device is moving away from the first access point, and moving towards the second access point.

12. The system of claim 10, wherein, to determine the moving direction of the mobile device, the system is configured to:
obtain, based on a first packet transmitted from the mobile device to the first access point, a first received signal strength indicator (RSSI);
obtain, based on a second packet transmitted from the mobile device to the second access point, a second RSSI; and
determine, based on the first RSSI and the second RSSI, the moving direction of the mobile device.

13. The system of claim 12, wherein, to obtain the second RSSI, the system is configured to:
acquire, by the second access point and from the access control device, connection information of the first connection, wherein the connection information includes connection parameters, an access code, and a frequency hopping pattern of the first connection;
determine, based on the connection information, a communication window;
receive, by the second access point, a data package of the first connection within the communication window; and
synchronize, based on the data package of the first connection, a clock of the second access point with a clock of the first access point to enable the second access point to receive subsequent data packages of the first connection, wherein the second RSSI is determined based on the subsequent data packages of the first connection received by the second access point.

14. The system of claim 13, wherein, to establish the second connection connecting the mobile device with the second access point, the system is configured to:
compare the second RSSI with a signal threshold;
determine, in response to the second RSSI larger than the signal threshold, a connection anchor point; and
establish, at the connection anchor point, the second connection.

15. The system of claim 14, wherein the connection anchor point is associated with a frequency hopping sequence.

16. A non-transitory computer-readable storage medium storing a computer program, wherein, upon being executed by a processor, the computer program causes the processor to perform a wireless roaming method applicable to an access control device, the method comprises:

setting, by the access control device, an Identity Resolving Key (IRK) of a first access point to be the same as an IRK of a second access point;

determining a moving direction of a mobile device, wherein the mobile device is in a first connection connecting with the first access point; and establish, by the second access point and in response to a determination that the moving direction meets a preset condition, a second connection connecting the mobile device with the second access point, by:

establishing, based on the IRK of the second access point, the second connection connecting the mobile device with the second access point; and disconnect, by the first access point, the first connection, wherein the first access point and the second access point are both connected to the access control device.

17. The storage medium of claim 16, wherein the preset condition indicates that the mobile device is moving away from the first access point, and moving towards the second access point.

\* \* \* \* \*

UNITED STATES PATENT AND TRADEMARK OFFICE
CERTIFICATE OF CORRECTION

| | | |
|---|---|---|
| PATENT NO. | : 11,178,728 B1 | Page 1 of 1 |
| APPLICATION NO. | : 16/925065 | |
| DATED | : November 16, 2021 | |
| INVENTOR(S) | : Gu et al. | |

It is certified that error appears in the above-identified patent and that said Letters Patent is hereby corrected as shown below:

In the Claims

Column 18, Claim 10, Line 14 that reads "mobile deice" should read -mobile device- Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*